(12) United States Patent
Vlassis et al.

(10) Patent No.: US 10,127,694 B2
(45) Date of Patent: Nov. 13, 2018

(54) ENHANCED TRIPLET EMBEDDING AND TRIPLET CREATION FOR HIGH-DIMENSIONAL DATA VISUALIZATIONS

(71) Applicant: Adobe Systems Incorporated, San Jose, CA (US)

(72) Inventors: Nikolaos Vlassis, San Jose, CA (US); Ehsan Amid, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 32 days.

(21) Appl. No.: 15/356,169

(22) Filed: Nov. 18, 2016

(65) Prior Publication Data

US 2018/0144518 A1    May 24, 2018

(51) Int. Cl.
*G06T 11/20* (2006.01)
*G06F 17/18* (2006.01)

(52) U.S. Cl.
CPC ............ *G06T 11/206* (2013.01); *G06F 17/18* (2013.01)

(58) Field of Classification Search
CPC ......... G06F 17/30864; G06F 17/30867; G06F 17/30675; G06F 17/30882; G06F 17/30038; G06F 17/30265; G06Q 10/10; G06Q 30/02
See application file for complete search history.

(56) References Cited

PUBLICATIONS

Agarwal, S.; Wills, J.; Cayton, L.; Lanckriet, G.; Kriegman,; "Generalized Non-metric Multidimensional Scaling"; Proceedings of the Eleventh International Conference on Artificial Intelligence and Statistics (AISTATS-07); Mar. 21-24, 2007, San Juan, Puerto Rico
D.; and Belongie, S. 2007. Generalized non-metric multidimensional scaling. In Proceedings of the Eleventh International Conference on Artificial Intelligence and Statistics.
Amid, E., and Ukkonen, A. 2015. Multiview triplet embedding: Learning attributes in multiple maps. In Proceedings of the 32nd International Conference on Machine Learning (ICML-15), 1472-1480. JMLR Workshop and Conference Proceedings.
Dawid, A. P., and Skene, A. M. 1979. Maximum likelihood estimation of observer error-rates using the em algorithm. Applied statistics 20-28.
Ding, N., and Vishwanathan, S. V. N. 2010. t-logistic regression. In Proceedings of the 23th International Conference on Neural Information Processing Systems, NIPS'10, 514-522. Cambridge, MA, USA: MIT Press.

(Continued)

*Primary Examiner* — Todd Buttram
(74) *Attorney, Agent, or Firm* — Keller Jolley Preece

(57) ABSTRACT

The present disclosure relates to a triplet embedding system that improves dimensionality reduction through exponential triplet embedding. In particular, the triplet embedding system employs heavy-tailed properties of t-exponential distributions and robust non-convex loss functions to improve visualizations in the presence of noisy data. In addition, the triplet embedding system uses triplet similarity weighting and improved sampling to improve and accelerate triplet embedding in large datasets. Overall, the triplet embedding system produces improved dimensionality reduction visualizations, which accurately reveal the underlying structure of the real-world high-dimensional datasets in lower-dimensional space.

20 Claims, 11 Drawing Sheets

(56) References Cited

PUBLICATIONS

Ellis, D. P. W.; Whitman, B.; Berenzweig, A.; and Lawrence, S. 2002. The Quest for Ground Truth in Musical Artist Similarity. In Proceedings of the 3rd International Conference on Music Information Retrieval (ISMIR '02), 170-177.

LeCun, Y., and Cortes, C. 1999. The MNIST database of handwritten digits.

Maaten, L. v. d., and Hinton, G. 2008. Visualizing data using t-sne. Journal of Machine Learning Research 9(Nov.): 2579-2605.

Naudts, J. 2002. Deformed exponentials and logarithms in generalized thermostatistics. Physica A 316:323-334.

Naudts, J. 2004a. Estimators, escort probabilities, and phiexponential families in statistical physics. Journal of Inequalities in Pure and Applied Mathematics 5(4):102.

Naudts, J. 2004b. Generalized thermostatistics and meanfield theory. Physica A 332:279-300.

Naudts, J. 2004c. Generalized thermostatistics based on deformed exponential and logarithmic functions. Physica A 340:32-40.

Raykar, V. C., and Yu, S. 2012. Eliminating spammers and ranking annotators for crowdsourced labeling tasks. J. Mach. Learn. Res. 13(1):491-518.

Tamuz, O.; Liu, C.; Belongie, S.; Shamir, O.; and Kalai, A. T. 2011. Adaptively Learning the Crowd Kernel. In Proceedings of the 28th International Conference on Machine Learning (ICML-11).

Tanaka, M. 2002. A consideration on a family of q-normal distributions. IEICE transactions on information and systems 85(2):435-436.

van der Maaten, L., and Weinberger, K. 2012. Stochastic triplet embedding. In 2012 IEEE International Workshop on Machine Learning for Signal Processing, 1-6.

Wainwright, M. J., and Jordan, M. I. 2008. Graphical models, exponential families, and variational inference. Foundations and Trends in Machine Learning 1(1-2):1-305.

Whitehill, J.; Ruvolo, P.; Wu, T.; Bergsma, J.; and Movellan, J. R. 2009. Whose vote should count more: Optimal integration of labels from labelers of unknown expertise. In Advances in Neural Information Processing Systems 22, 2035-2043.

Wilber, M.; Kwak, S.; and Belongie, S. 2014. Cost-effective hits for relative similarity comparisons. In Human Computation and Crowdsourcing (HCOMP).

Yun, H.; Raman, P.; and Vishwanathan, S. V. N. 2014. Ranking via robust binary classification. In Proceedings of the 27th International Conference on Neural Information Processing Systems, NIPS'14, 2582-2590. Cambridge, MA, USA: MIT Press.

ENHANCED TRIPLET EMBEDDING AND TRIPLET CREATION FOR HIGH-DIMENSIONAL DATA VISUALIZATIONS

BACKGROUND

Dimensionality reduction, in general terms, relates to presenting high-dimensional data within a lower-dimensional representation such that representation depicts the structure of the high-dimensional data as accurately as possible. Dimensionality reduction has many applications, such as identifying otherwise unknown relationships between objects. Generally, dimensionality reduction includes showing relationships between objects in a lower-dimensional representation, such as two-dimensional (2-D) visualization (e.g., scatter plot) or three-dimensional (3-D) visualization.

Several dimensionality reduction techniques such, as t-distributed Stochastic Neighbor Embedding (t-SNE), have been successfully applied to real-world datasets to unveil the underlying structure of the datasets. However, this and other dimensionality reduction techniques suffer from a number of problems. For instance, these conventional dimensionality reduction systems fail to produce accurate results when information for a dataset is incomplete. For example, while conventional systems provide lower-dimensional representations of higher-dimensional data, relationships shown in the lower-dimensional representations often do not accurately reflect corresponding relationships found in the original space (e.g., the representation does not reflect a truthful embedding of the original high-dimensional data).

As another problem, conventional systems have limited scalability due to the high computational complexity required by existing dimensionality reduction techniques. In particular, as the size of a dataset increases, the processing time and resources increases exponentially. This problem is further amplified as technological advances have enabled lower costs for collecting and gathering data, leading to ever increasing datasets. Accordingly, conventional systems can become computationally slow or even limited when handling large datasets.

Another technique that conventional systems employ for dimensionality reduction is t-distribution Stochastic Triplet Embedding (t-STE). t-STE uses triplets to learn an embedding for a set of objects based on relative distance comparisons (called "triplet embedding"). As used herein, the term "triplet" refers to a set of three items or objects (e.g., multi-dimensional data points) that compares the relative distance (i.e., similarity) of the first item in the triplet to the remaining two items. For example, a triplet that includes the items A, B, and C can indicate that Item A is more similar to Item B than to Item C. Accordingly, the pairwise distance between Item A and Item B is shorter that the pairwise distance between Item A and Item C. As described herein, the term "triplet constraint" refers to the above-mentioned similarity relationship. Further, relative similarity comparisons for a triplet are often provided in the form of (i,j|k), meaning that "item i is more similar to j than k."

As mentioned above, the similarity comparison in a triplet is often a relative measurement. In other words, while a triple indicates that a first item is more similar to a second item than to a third item, the triplet provides no indication as to why the first item is more similar to the second item or which similarity metric was used to arrive at this conclusion. As such, triplets enable a human evaluator to compare items that do not have quantitative values. Stated differently, human evaluators can easily create triplets based on similarity comparisons rather than absolute comparisons. For example, a human evaluator determines that Movie A and Movie B are more alike than Movie A and Movie C as opposed to determining that Movie A and Movie B are 70% alike while Movie A and Movie C are 45% alike.

Using relative similarity comparisons, however, has created additional problems for conventional systems. Specifically, a large portion of triplet data is gathered through crowdsourcing platforms where human evaluators manually judge similarities between items. Because human evaluators may consider different notions of similarity, triplets often include inconsistent and conflicting similarity constraints. As an example of a conflicting similarity constraint, one person determines that Movie A is more like Movie B (e.g., (A, B|C)), while another person determines that Movie A is more like Movie C (e.g., (A, C|B)).

The presence of inconsistent or conflicting similarity constraints in a dataset is called noise. Noise in a dataset that includes crowdsourced triplets is almost unavoidable due to the different skill levels or opinions of human evaluators. A major drawback of conventional systems, and t-STE in particular, is their incapability to handle datasets with even low levels of noise. In particular, conventional systems overcompensate and overcorrect when a noisy or outlier triplet is present, which results in an inaccurate dimensionality reduction, which again leads to an untruthful embedding of the underlying data. Visual examples illustrating how the performance of conventional systems drops drastically with the introduction of noise are provided below in connection with the figures.

These along with additional problems and issues exist with regard to current and traditional dimensionality reduction methods and techniques. Accordingly, there remains a need for an improvement in the area of dimensionality reduction.

BRIEF SUMMARY

One or more embodiments of the present disclosure include systems and methods that provide improved dimensionality reduction and visualization creation through a novel triplet embedding process that produces accurate visualizations while being robust to noise. In particular, in one or more embodiments, the disclosed systems access a dataset that includes items organized into triplets where each triplet includes similarity constraints among the items in the triplet. Using the accessed items, the disclosed systems determine a triplet embedding (i.e., feature representation) for the items that satisfies a high number of similarity constraints but also ignores unsatisfied similarity constraints. Based on ignoring the unsatisfied similarity constraints, the disclosed systems generate a visualization that accurately illustrates relationships between the items of the dataset despite the presence of noise.

Further, the disclosed systems and methods provide improved triplet creation that improves accuracy and reduces computational requirements. In particular, the disclosed systems and methods achieve improved dimensionality reduction through generating a triplet similarity weight for each of triplet. For example, in one or more embodiments, the disclosed systems obtain a feature representation for a large dataset of items and create a set of triplet for the items. For each triplet, the systems and methods determine similarity ratios. For example, the disclosed systems determine the similarity ratio based on the distance between the first item and the second item relative to the distance between of the first item and the third item. Based on the similarity ratio, the systems and methods generate a triplet similarity weight for each triplet. In addition, the systems and methods generate a visualization illustrating relationships between the set of items based on the determined triplet similarity weight and the triplet embedding.

Additional features and advantages of one or more embodiments of the present disclosure are set forth in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

DETAILED DESCRIPTION

Figure 1:
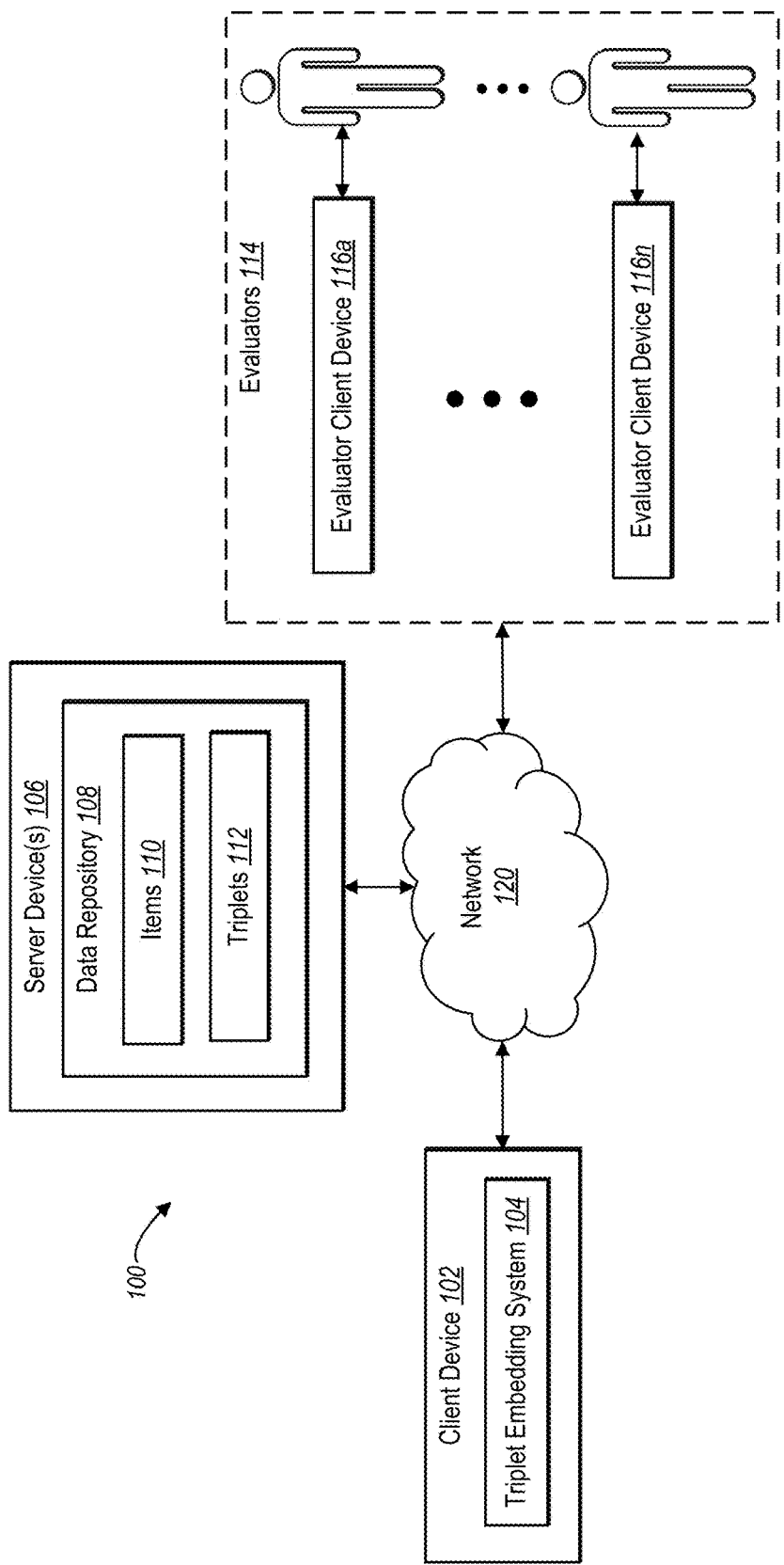
FIG. 1 illustrates a schematic diagram of an example communication environment in which a triplet embedding system operates in accordance with one or more embodiments.

One or more embodiments of the present disclosure include a triplet embedding system that improves dimensionality reduction through exponential triplet embedding. As such, the triplet embedding system improves visualizations in the presence of noisy data. For example, in one or more embodiments, the triplet embedding system employs heavy-tailed properties of t-exponential distributions and robust non-convex loss functions to accurately rank and classify items in a dataset. In addition, the triplet embedding system optionally uses triplet similarity weighting and improved sampling to improve and accelerate triplet embedding in large sets of data. As a result, the triplet embedding system produces high-quality results that reveal the underlying structure of the real-world high-dimensional datasets while lowering computational requirements.

As briefly mentioned above, the triplet embedding system improves visualizations in the presence of noisy data. More specifically, the triplet embedding system identifies and ignores unsatisfied similarity constraints that otherwise would cause the triplet embedding system to output inaccurate results. To illustrate, in one or more embodiments, the triplet embedding system accesses a dataset that includes items organized into triplets where each triplet is based on similarity constraints (e.g., comparisons) between the items in the triplet. As described below, large datasets often include incomplete, conflicting, and/or incompatible similarity constraints, both of which introduce noise into the dataset.

Using the accessed items, the triplet embedding system identifies a triplet embedding for the items that satisfies a high number of similarity constraints. Ideally, the triplet embedding system identifies a triplet embedding (i.e., feature representation) that satisfies (e.g., describes, explains, or justifies) the most possible similarity constraints in the dataset or results in a high probability of satisfying each similarity constraint. As part of determining or learning a triplet embedding, in some embodiments, the triplet embedding system ignores similarity constraints that are unsatisfied or have a high probability of being unsatisfied. By giving up (i.e., ignoring) one or more unsatisfied similarity constraints, the triplet embedding system minimizes the effect of noisy similarity constraints.

Using the determined triplet embedding, the triplet embedding system generates a visualization that illustrates relationships between the items of the dataset. For example, the triplet embedding system generates a 2-D scatter plot of the dataset. Accordingly, a user can visualize each item in the dataset as it relates to the other items, viewing similarities and differences between items. The triplet embedding system creates such accurate visualizations despite that fact that the triplets in the dataset may include subject comparisons created by unknown criteria.

Further, the triplet embedding system eliminates the need for any extra pre-processing steps. For example, some conventional systems require a user to manually identify and prune noisy triplets from data collected by crowdsourcing before a dataset is useable. Such a task is burdensome and time-consuming task. Further, pruning out conflicting similarity constraints eliminates valuable data. In contrast, the triplet embedding system eliminates the need for pruning and enables use of all collected data in a dataset, while automatically ignoring constraints that cause noise.

In addition to using a triplet embedding that ignores unsatisfied similarity constraints of triplets, in one or more embodiments, the triplet embedding system achieves improved dimensionality reduction through intelligent weighting (e.g., triplet similarity weighting). The triplet embedding system uses triplet similarity weighting to give more weight to more informative triplets and less weight to less informative triplets. Thus, the use of triplet similarity weighting enables the triplet embedding system to provide more accurate visualizations.

More specifically, the triplet embedding system determines similarity ratios for each triplet. In particular, the triplet embedding system identifies the two pairwise distances in each triplet (e.g., the distance from the first item to the second item and the distance from the first item and the third item). The triplet embedding system then computes a similarity ratio based on the two pairwise distances. Using the similarity ratio, the triplet embedding system generates or creates a weight for the triplet.

As a note on similarities and weights, a triplet with a high similarity ratio is considered a "sharp" triplet. In other words, a triplet is sharp when the similarity between the first and second items in the triplet is large (e.g., a short distance between the respective data points) and/or the similarity of the first and third item in the triplet is small (e.g., a long distance between the relative data points). A sharp triplet is distinct and definite, and as such, is given greater weight than is given to a non-sharp triplet. For example, when the distance between the first and second items over the distance between the first and third items is small (e.g., the ratio approaches 0), the triplet embedding system generates a larger weight. Conversely, when the ratio is large, the triplet embedding system generates a smaller weight. Accordingly, the triplet embedding system affords more weight to sharper triplets, which results in improved accuracy when performing dimensionality reduction.

The use of triplet weighting allows the triplet embedding system to glean or learn more information from a smaller amount of triplets. Thus, the use of triplet weighting allows the triplet embedding system to be more efficient and use less processing power than conventional triplet embedding models. In particular, by using less, but more informative, triplets, the triplet embedding system is able to solve the embedding optimization algorithm faster and with less computations.

To take advantage of the triplet weighting, the triplet embedding system optionally employs improved sample selection of triplets in a dataset. Rather that creating every possible triplet, the triplet embedding system creates a limited set of triplets for each item in the dataset. For example, the triplet embedding system identifies a relatively low number (e.g., 10-30 items) of nearest-neighbors and random non-nearest-neighbors for each item. The triplet embedding system then creates a subset of triplets for each item using the item and a combination of the nearest-neighbors with the non-nearest-neighbors. The triplet embedding system then uses these triplets to generate a low-dimensional visualization illustrating relationships between the items in the dataset. In this manner, the triplets can achieve comparable visualization results using the limited set of triplets rather than employing a full set of triplets, which reduces computational requirements from being exponentially proportional to linearly proportional to the size of the dataset.

Additional benefits, advantages, features and characteristics of the triplet embedding system are described below with respect to the figures, which describes one or more embodiments of the triplet embedding system. To illustrate, FIG. 1 shows an exemplary environment 100 in which a triplet embedding system 104 can operate. The environment 100 enables operation of one or more example embodiments of the triplet embedding system 104. As illustrated, the triplet embedding system 104 resides on a client device 102. In some embodiments, a user, such as a researcher, reviewer, or administrator uses the client device 102 to view and interact with visualizations that the triplet embedding system 104 generates.

FIG. 1 also shows the triplet embedding system 104 communicating with a data repository 108 via a network 120. The data repository 108 resides on one or more server device(s) 106. In addition, the data repository 108 includes items 110 and triplets 112 belonging to a dataset. For example, in one or more embodiments, the data repository 108 serves as a memory device that retains item information (e.g., attributes of the items, item metadata, vectored data points) and/or triplet information (e.g., similarity constraints).

Although FIG. 1 illustrates a particular arrangement of the various components within the environment 100, various additional arrangements are possible. For example, in some embodiments, the triplet embedding system 104 and the data repository 108 are located on the same computing device or system of devices. As another example, the data repository 108 is part of the triplet embedding system 104. Additional details regarding the various computing devices and networks are explained below with respect to FIG. 10.

In general, the triplet embedding system 104 provides improved dimensionality reduction and visualizations through t-exponential triplet embedding. As part of performing dimensionality reductions, the triplet embedding system 104 uses items 110 from a dataset housed in the data repository 108. Data within the data repository 108 can include third-party data or data gathered by the triplet embedding system 104. For example, the data repository 108 includes crowdsourced data from human evaluators (e.g., evaluators 114).

To illustrate, in some embodiments, the environment 100 includes evaluators 114 (noted by the dashed line). As shown, the evaluators 114 include a group of evaluator client devices 116a-n corresponding to human evaluators. The evaluator client devices 116a-n can include any computing device that enables human evaluators to provide data regarding items and triplets to the data repository 108.

As mentioned above, human evaluators often provide similarity constraints for items in a dataset by identifying triplets for each item in the dataset. Ideally, each human evaluator that evaluates a dataset provides triplets for every combination of items within a dataset. In this manner, each full triplet set is assessed by the same evaluator, which increases consistency across the triplet set. The ideal case, however, is rarely possible. For example, while an evaluator is able to provide triplets for a dataset with 10 items (e.g., 36 triplets for each item and a total of 360 triplets), it is infeasible for a single evaluator to provide a full set of triplets for a dataset with 500 items (e.g., just under 500 thousand triples per item and nearly 250 million total triplets).

To overcome this challenge in large datasets, the data repository 108 employs crowdsourcing (e.g., enlisting the services of a large group of people, often via the Internet) to obtain triplet data for large datasets. For example, for each evaluator, the data repository 108 randomly selects a small number of items 110 and prompts the evaluator to determine triplets 112 for the items. Over time, the data repository 108 collects one or more full triplet sets for the dataset.

However, as described previously, human evaluators may consider different notions of similarity when comparing items, which can result in inconsistent or conflicting triplets. For example, some evaluators 114 judge Movie A to be more like Movie B than Movie C (e.g., (A, B|C)), while other evaluators 114 judge Movie A to be more like Movie C than Movie B (e.g., (A, C|B)). As a result, items 110 and triplets 112 within a dataset in the data repository 108 include noisy similarity constraints, which cause conventional dimensionality reduction systems to perform poorly.

Further, even with crowdsourcing efforts, a dataset may be incomplete. For example, due to the size of a dataset, the data repository 108 may not collect all possible triplets for a dataset. In another example, the data repository 108 does not gather enough to copies of every triplet to identify truthful triplet information (e.g., to account for any bias that may exist). As discussed above, conventional systems also often perform poorly with inadequate or incomplete data.

Rather than obtain data from the evaluators 114, in some embodiments, the data repository 108 collects data from monitoring and/or tracking the actions of users. For example, the data repository 108 collects user data (e.g., click data, analytic data, and/or conversation data) for each user that visits a website or group of websites. Similarly, the data repository 108 can collect other types of multi-dimensional data based on user interactions. Alternatively, the data repository 108 collects multi-dimensional non-user data from one or more third-party source.

Based on collected or otherwise obtained data, in one or more embodiments, the data repository 108 generates triplet data. For example, the data repository 108 creates one or more triplets for each item 110 or object in a dataset. Alternatively, the data repository 108 can use synthetic data to create triplets. For instance, the data repository 108 creates and uses synthetic data for the purpose of testing and refining the triplet embedding system 104. In one or more embodiments, the data repository 108 provides data (real or synthetic) to the triplet embedding system 104 and the triplet embedding system 104 generates triplet data for the dataset, as described below.

As used herein, the term "dimensionality reduction" generally refers to process of reducing high-dimensional data from a high-dimensional space to a lower-dimensional space. Dimensionality reduction can include identifying and employing a mapping or encoding that reduces high-dimensional variables (i.e., high-dimensional data) into a low-dimensional representation in a manner that preserves that the structure of the original high-dimensional data as accurately as possible. Dimensionality reduction can include using a formulation, operation, or value-set to perform data reductions. Dimensionality reduction often employs machine learning techniques including supervised learning, clustering, and feature detection, to reduce data into lower-dimensional space.

The term "dimensional space," as used herein generally refers to a mathematical multiple-dimensional space. Dimensional space can be high-dimensional (e.g., a large number of dimensions) or a corresponding lower-dimensional space (e.g., a lesser number of dimensions). In some instances, lower-dimensional space is a two- or three-dimensional space.

The term "dimensional data" refers a point in dimensional space that includes multiple attributes, where the number of attributes is less than or equal to the number of dimensions in the dimensional space in which the point resides (e.g., an n-dimensional space accommodates an n-dimensional point). As such, each attribute value for the point is represented (e.g., embedded) within a corresponding dimension of the dimensional space. As mentioned above, in some embodiments, a triplet includes a group of three multi-dimensional data points.

The term "feature representation," generally refers to a data function or technique that transforms a feature (e.g., identifiable or learnable attributes of a data point) into a representation in a predictable and repeatable manner. An example of a feature representation within the context of dimensionality reduction is a triplet embedding, which involves creating a lower-dimensional visualization from high-dimensional data by using triplets and their corresponding similarity constraints. In one or more embodiments, the triplet embedding system can perform a triplet embedding using machine learning techniques.

The term "data visualization," as used herein refers to a representation of high-dimensional data in a lower-dimension by employing dimensionality reduction. In general, high-dimensional data is often difficult to measure and determine relationships. As such, dimensionality reduction enables a user to view relationships in high-dimensional data when mapped as a lower-dimensional representation.

Figure 2A:
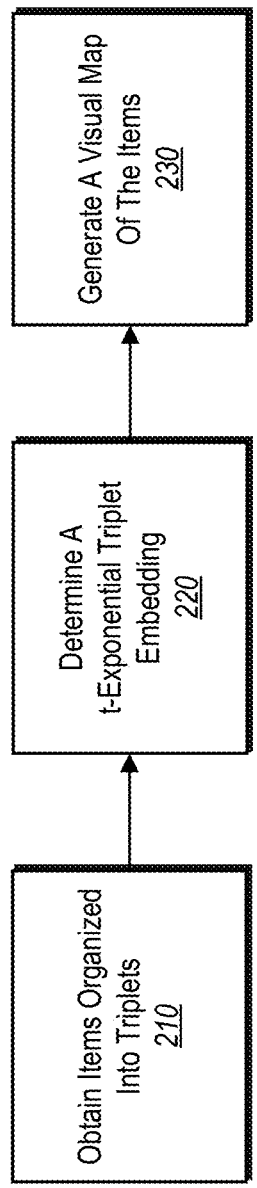
FIGS. 2A-2B illustrate example block-flow diagrams of the triplet embedding system generating a visualization that illustrates relationships between items in a dataset in accordance with one or more embodiments.

FIG. 2A illustrates an example block-flow diagram of the triplet embedding system generating a lower-dimensional visualization that illustrates relationships between items in a dataset that corresponds to high-dimensional data. As shown, to generate a lower-dimensional visualization, the triplet embedding system obtains 210 items organized into triplets. As described above, the triplet embedding system can receive a dataset of items, including triplets, from a data repository. For example, the data repository provides the triplet embedding system with triplets evaluated by one or more evaluators. Alternatively, the triplet embedding system generates triplet data for items in a dataset.

Additionally, as part of generating the lower-dimensional visualization, the triplet embedding system identifies a triplet embedding (i.e., feature representation), such as a triplet embedding that employs a loss function that minimizes noisy similarity constraints. To illustrate, the triplet embedding system determines 220 a t-Exponential Triplet Embedding (e.g., a t-ETE function). While the t-ETE function is described in connection with FIG. 2A, detail information regarding the t-ETE function is provided below in connection with FIGS. 4A and 4B.

In one or more embodiments, determining a t-ETE includes performing a step for generating a feature representation (e.g., triplet embedding) for the triplets that minimizes an inverse probability that the triplets are satisfied (i.e., the similarity constraints for the triplets are satisfied) and that also ignores one or more similarity constraints that cause noise. For example, the triplet embedding system creates and solves an objective function that minimizes the summation of satisfaction probabilities for each triplet, where the satisfaction probabilities for each triplet are inverted. The resulting t-ETE function is an objective function that satisfies the highest number triplet similarity constraints in the dataset. While the t-ETE function minimizes the inverse probability that the triplets are satisfied and that also ignores one or more similarity constraints that cause noise as one step, for purposes of explanation, each action within the step is described below.

To illustrate, the step of generating a feature representation (e.g., triplet embedding) includes determining satisfaction probabilities for each triplet (the probability that a triplet embedding satisfies the triplet). A probability that approaches 1 (one) indicates that the triplet embedding satisfies the triplet. Conversely, a probability that approaches 0 (zero) indicates that the triplet embedding does not satisfy the triplet, or that the triplet is unsatisfied. In some embodiments, when the probability of a triplet is close 1 or 0, the triplet can be referred to as "highly satisfied" or "highly unsatisfied," respectively. Further detail with regard to determining triplet probabilities is provided below in connection with FIGS. 4A and 4B.

In some embodiments, determining satisfaction probabilities for each triplet includes applying a t-Gaussian distribution to the triplets. As described below, the triplet embedding system employs the t-Gaussian distribution because the t-Gaussian distribution focuses on heavy-tailed distributions. Thus, by applying the t-Gaussian distribution to the triplets, the triplet embedding system can better identify triplets that are unsatisfied and highly unsatisfied.

Returning to determining a t-ETE, performing the step of generating a feature representation (e.g., triplet embedding) can also include inversing the satisfaction probabilities and applying a logarithmic (or simply "log") function to the inverted satisfaction probabilities. In some embodiments, if the triplet embedding system applies the t-Gaussian distribution to the satisfaction probabilities, the triplet embedding system employ a t-Gaussian distribution based log function, As an additional part of performing the step of generating a feature representation, the triplet embedding system minimizes the sum of the inverted satisfaction probabilities. More specifically, the triplet embedding system minimizes the sum of the log of inverse probabilities over all the applicable triplets. In some instances, the triplet embedding system further employs gradient descent (e.g., vanilla gradient descent) to further optimize triplet embedding. By applying the log transformation and minimizing the inverted satisfaction probabilities over all triplets, the triplet embedding system increases the robustness of the loss function and reduces the negative effects of triplet noise. Stated differently, the triplet embedding system determines the t-ETE function, which "gives up" (i.e., ignores) those similarity constraints that are highly unsatisfied and thus, handles noise more efficiently than conventional systems. Further detail with regard to minimizing the sum of the probabilities is provided below in connection with FIGS. 4A and 4B.

In additional, the triplet embedding system generates 230 a visual map of the items. For example, the triplet embedding system generates a visualization illustrating relationships between the items in the dataset. In particular, the triplet embedding system uses the determined t-ETE triplet embedding to display a lower-dimensional visualization (e.g., a scatter plot) that is unaffected by noisy triplet similarity constraints.

Figure 2B:
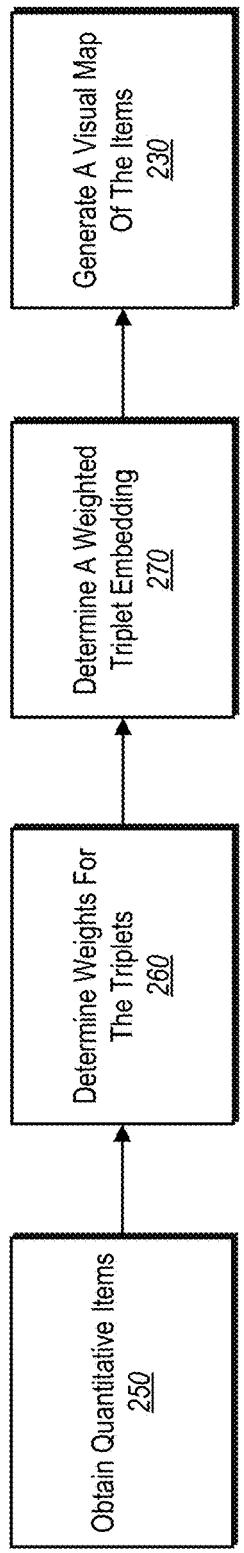

FIG. 2B illustrates another example block-flow diagram of the triplet embedding system generating a lower-dimensional visualization that illustrates relationships between items in a dataset that corresponds to high-dimensional data. In particular, FIG. 2B illustrates generating a lower-dimensional visualization using triplet similarity weighting.

As shown, to generate a lower-dimensional visualization, the triplet embedding system obtains 250 quantitative items. In particular, the triplet embedding system obtains a dataset where at least a subset of items include quantitative data that enables the triplet embedding system to determine measurable distances/similarities between the items. In one or more embodiments, as described above, the subset of items is organized into triplets. In alternative embodiments, as described below, the triplet embedding system generates triplets based on the quantitative information associated with the quantitative items.

Next, the triplet embedding system determines 260 weights for the quantitative items. As mentioned above, the triplet embedding system can use triplet similarity weighting to improve relationship accuracy of high-dimensional data as shown in lower-dimensional visualizations. Further, in some instances, the triplet embedding system performs triplet similarity weighting in connection with improved sampling, as described below.

To demonstrate, the triplet embedding system creates triples for quantitative items in the dataset. Then, for each triplet, the triplet embedding system creates a similarity ratio, which is used to assign weights to each triplet. In particular, the triplet embedding system uses the quantitative information associated with the quantitative items to determine data points for each item in the dataset, which carries over to the created triplets. Because each quantitative item is associated with a data point, the triplet embedding system can perform actual, rather than relative, comparisons on each triplet.

As one example embodiment of weighting triplets, the triplet embedding system uses the data points of a first quantitative item and a second quantitative item in a triplet to calculate the pairwise distance between the two items. Likewise, the triplet embedding system uses the data points of the first quantitative item and a third quantitative item to calculate their pairwise distance. Then, using the two pairwise distances, the triplet embedding system determines a distance ratio for the triplet.

In general, each triplet includes a shorter pairwise distance and a longer pairwise distance. The item pairing with the shorter distance indicates a closer similarity than the item pairing with the longer distance. As such, the distance between two items is inversely proportional to the similarity between the two items. In addition, because triplets are organized according to item similarity (e.g., distance), the second item in each triplet will be closer than the third item in pairwise distance to the first item. Accordingly, the distance ratios will generally be less than 1 (one) (i.e., the short pairwise distance over longer pairwise distance).

Based on the distance ratio for each triplet, the triplet embedding system determines a similarity ratio. Because the pairwise distance between two quantitative items in a triplet is inversely proportional to the similarity between the two items, the distance ratio of a triplet is inversely proportional to the similarity ratio of the triplet. As such, the triplet embedding system inverts the distance ratio to obtain the similarity ratio. For example, if the distance ratios is 1/5 (e.g., the second item in the triplet is five times closer to the first item than the third item is to the first item), then the similarity ratio is 5 (e.g., the second item in the triplet is five times more similar to the first item than the third item is to the first item).

As the similarity ratio of a triplet increases, the more distinct and definite (e.g., sharp) the triplet becomes. A triplet that is sharper than another triplet provides more information to the triplet embedding system regarding the relationships of the items within the triplet. By providing more information to the triplet embedding system, the triplet embedding system can better satisfy the triplet when identifying and applying a triplet embedding to the triplet.

As mentioned above, the triplet embedding system uses the similarity ratios to assign weights to each triplet that are proportional to the similarity ratios. In other embodiments, the triplet embedding system first applies a smoothing factor to the similarity ratio before assigning triplet weights, which results in a smoother overall weighting distribution among the triplets.

Once weights are assigned, in one or more embodiments, the triplet embedding system normalizes the weights for further improve weighing distribution. For example, the triplet embedding system divides the total sum and adds a positive constant value. Examples of weighting functions, smoothing factors, and normalizing weights are described below with respect to FIGS. 4A and 4B.

As mentioned above, in one or more embodiments, determining weights for the triplets in a dataset in FIG. 2B includes improved sampling. Improved sampling enables the triplet embedding system to determine triplet weights using a reduced number of triplets. As described above, based on receiving quantitative items in a dataset, the triplet embedding system creates triplets for triplets in a dataset to determine the triplet's weight. Accordingly, for a dataset of n items, conventional triplet embedding processes may identify $n^3$ triplets (e.g., exponential growth), which becomes infeasible. By employing the improved sampling, the triplet embedding system limits the number of triplets needed such that the number is linearly proportional to the number of items in a dataset rather than exponential.

As an example of improved scaling, the triplet embedding system creates a limited set of triplets for each quantitative item in a dataset. In particular, the triplet embedding system selects a number of nearest-neighbors ($k_n$) and a number of non-nearest-neighbors ($k_o$). In general, the triplet embedding system sets $k_n$ and $k_o$ such that $10 \leq k_n$, $k_o \leq 30$. Generally, $k_n$ and $k_o$ are set to values much smaller than n. While $k_n$ and $k_o$ are often set to the same number (e.g., both set to 20), $k_n$ and $k_o$ can be set to different numbers. For example, $k_n$ is set to 15 and $k_o$ is set to 25.

For each quantitative item, the triplet embedding system identifies the $k_n$ nearest-neighbor items to that item. Specifically, the triplet embedding system identifies the $k_n$ most similar items as indicated by items having the shortest pairwise distance with the item. In addition, the triplet embedding system identifies $k_o$ non-nearest-neighbor items for each item. Non-nearest-neighbors items can be randomly selected from items in the dataset and exclude the $k_n$ nearest-neighbor items selected for the item.

Then, using the set of selected $k_n$ nearest-neighbor items and $k_o$ non-nearest-neighbor items, the triplet embedding system creates a subset of triplets for the item that includes one or more combinations between a nearest-neighbor item and a non-nearest-neighbor item. The triplet embedding system combines each subset of triplets to form the limited set of triplets. In this manner, the triplet embedding system creates a limited set of triplets that includes, at most, $n \times k_n \times k_o$ triplets rather than $n^3$ triplets for a dataset.

Due to the intelligent nature of how the limited set of triplets is created, the limited triplets set provides triplet information (e.g., similarity constraints) that is comparable to a full triplet set. In particular, because each triplet in the limited triplet set includes a comparison between a nearest-neighbor and a non-nearest-neighbor, each triplet in the limited triplet set is highly distinct and definite (e.g., very sharp). As a result, each triplet in the limited triplet set provides valuable information to the triplet embedding system that enables the triplet embedding system to better identify and apply an optimal triplet embedding, which is described above.

The triplet embedding system also determines 270 a weighted triplet embedding. In general, determining the weighted triplet embedding includes determining a triplet embedding and applying the determined triplet weights from the quantitative items to the identified triplet embedding. For example, the triplet embedding system determines the t-ETE as described above in connection with FIG. 2A. In another example, the triplet embedding system determines another triplet embedding, such a SNE, t-SNE, STE, or t-STE. Regardless of which triplet embedding the triplet embedding system selects, the triplet embedding system applies the determined weights to the identified triplet embedding to determine the weighted triplet embedding.

In addition, the triplet embedding system generates 230 a visual map of the items. For example, the triplet embedding system generates a visualization illustrating relationships between the items in the dataset using the weighed triplet embedding. By using the weighed triplet embedding based on the triplet similarity weights for each triplet, the triplet embedding system provides highly-accurate relationship representations of the original high-dimensional data (e.g., the distance ratios between items in the lower-dimensional space better reflect the distance ratios in the original high-dimension space).

In one or more embodiments, the triplet embedding system combines the t-ETE function described in FIG. 2A with the triplet similarity weights described in FIG. 2B. For example, the triplet embedding system uses the t-ETE to determine a feature representation for items in a dataset, when enables the triplet embedding system to calculate quantitative data for each item in the dataset. Then, using the quantitative items, the triplet embedding system determines triplet similarity weights for each triplet. The triplet embedding system then applies the triplet similarity weights to the t-ETE to obtain a weighted t-ETE function. The triplet embedding system then generates a visual map using the weighted t-ETE function. An example of a weighted t-ETE function is provided below in connection with FIG. 4A and FIG. 4B.

Figure 3:
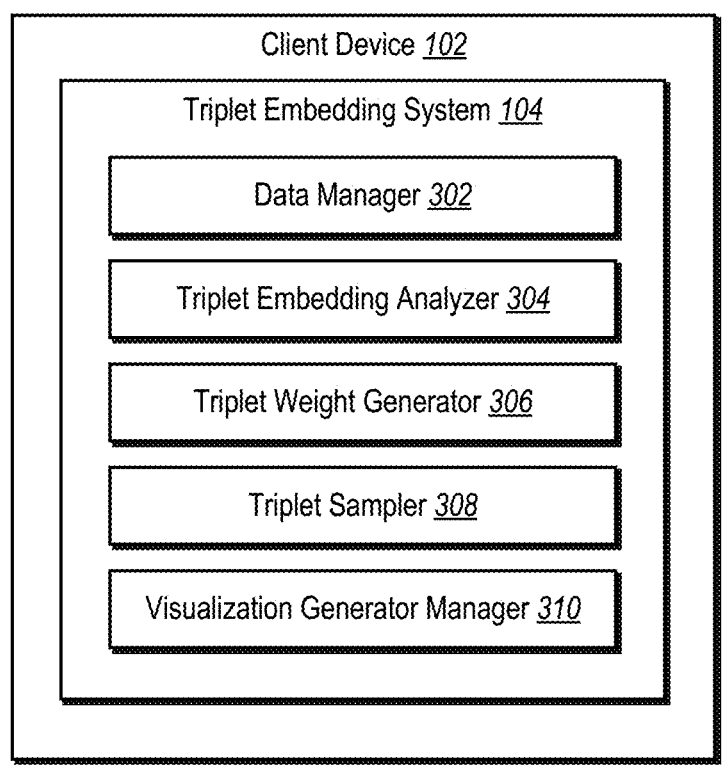
FIG. 3 illustrates an example schematic diagram of the triplet embedding system in accordance with one or more embodiments.

FIG. 3, as mentioned above, illustrates an example schematic diagram of the triplet embedding system 104. As shown, the triplet embedding system 104 resides on a client device 102. The illustrated client device 102 and the triplet embedding system 104 can be examples of the client device 102 and the triplet embedding system 104 described above (e.g., with respect to FIG. 1 and FIG. 2).

The triplet embedding system 104 includes various components for performing the processes and features described herein. For example, the triplet embedding system 104 in the illustrated embodiment includes a data manager 302, a triplet embedding analyzer 304, a triplet weight generator 306, a triplet sampler 308, and a display manager 310. The triplet embedding system 104 can include additional components not shown, such as a database for storing datasets and corresponding information.

The components 302-310 of the triplet embedding system 104 can comprise software, hardware, or both. For example, the components 302-310 can comprise one or more instructions stored on a computer-readable storage medium and executable by processors of one or more computing devices, such as a client device or server device. When executed by the one or more processors, the computer-executable instructions of the triplet embedding system 104 can cause the computing device(s) to perform the feature learning methods described herein. Alternatively, the components 302-310 can comprise hardware, such as a special-purpose processing device to perform a certain function or group of functions. Alternatively, the components 302-310 of the triplet embedding system 104 can comprise a combination of computer-executable instructions and hardware.

As mentioned above, the triplet embedding system 104 includes a data manager 302. In general, the data manager 302 obtains a dataset that includes items organized into triplets. For example, the data manager 302 obtains a dataset from a data repository or other third-party source. As part of obtaining items in a dataset, the data manager 302 also obtains attributes associated with each item, as described above. In some embodiments, the data manager 302 additionally obtains a triplet embedding for items in a dataset.

In one or more embodiments, the data manager 302 can store obtained data for a dataset in a database. For example, the data manager 302 stores items including item attributes, triplets including similarity constraints, and a triplet embedding in a database located in the client device 102. Alternatively, the data manager 302 stores the obtained data on a remote database connected to the client device 102 via a network connection.

As shown, the triplet embedding system 104 includes a triplet embedding analyzer 304. The triplet embedding analyzer 304 identifies a triplet embedding (i.e., feature representation) for items in a dataset as described above. For example, the triplet embedding analyzer 304 identifies a triplet embedding that satisfies a high number of triplet similarity constraints in a dataset. For instance, the triplet embedding analyzer 304 employs probabilities, summations, and log functions to identify an optimal triplet embedding, as provided above.

The triplet embedding system 104 also includes a triplet weight generator 306, as illustrated. In general, the triplet weight generator 306 generates weights for each triplet in a dataset. More specifically, the triplet weight generator 306 determines a distance ratio and/or similarity ratio as part of calculating triplet weights, as mentioned above. For example, the triplet weight generator 306 calculates a weight that is inversely proportional to the pairwise distances in a triplet.

As illustrated in FIG. 3, the triplet embedding system 104 also includes a triplet sampler 308. In one or more embodiments, the triplet sampler 308 reduces the number of triplets in a dataset needed by the triplet embedding analyzer 304 to identify a triplet embedding. In some embodiments, the triplet sampler 308 reduces the number of triplets needed by the display manager 310 to generate a visualization. For example, the triplet sampler 308 identifies nearest-neighbors and random non-nearest-neighbors for each item and creates a limited set of triplets for a dataset, as described above. By creating a limited triplet set, the triplet sampler 308 decreases the amount of processing time and resources needed by the client device 102 to identify and apply triplet embeddings.

In addition, the client device 102 includes a display manager 310. In general, the display manager 310 enables the display of lower-dimensional visualizations to represent high-dimensional data. In particular, the display manager 310 generates a lower-dimensional visualization using items in a dataset, triplets, a triplet embedding, and/or weights for each triplet, which is described above. In addition, the display manager 310 provides a visualization (e.g., a scatter plot) of the lower-dimensional visualization to a user.

In some embodiments, the display manager 310 enables user interaction with a visualization. For example, upon detecting a user selecting an item (e.g., plotted as a data point within a graphical user interface) in a visualization, the display manager 310 updates the graphical user interface to display attributes of the item. As another example, when a user selects multiple items in a visualization, the display manager 310 provides similarities and commonalities (or distinctions) between the selected items. In this manner, the display manager 310 enables a user to gain valuable insights regarding high-dimensional data represented in a lower-dimensional visualization. Examples of lower-dimensional visualization are provided in the FIG. 5 and FIG. 6 below.

Figure 4B:
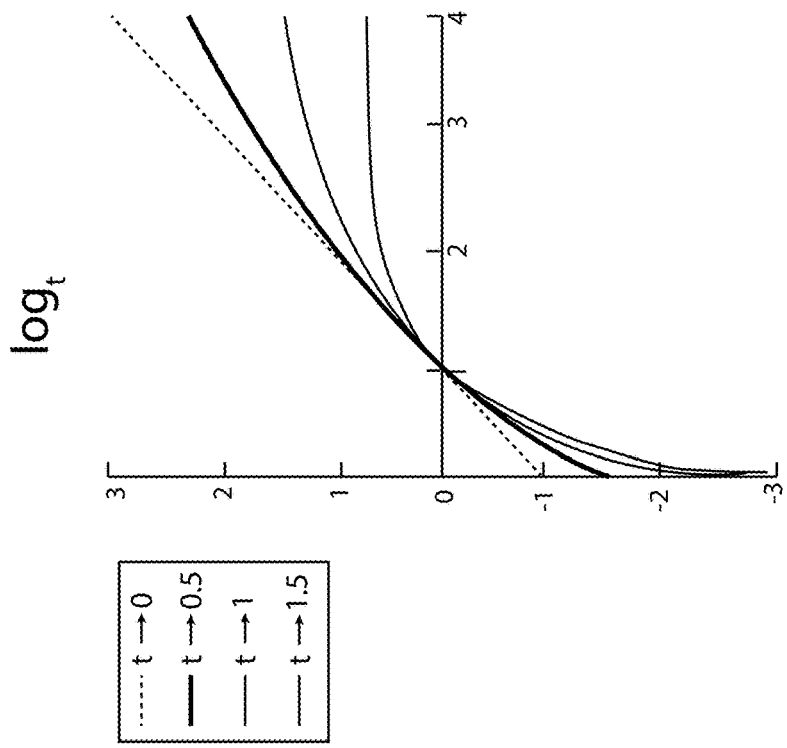
FIGS. 4A and 4B illustrate example results of exponential and logarithmic functions of the triplet embedding system in accordance with one or more embodiments.
Figure 4A:
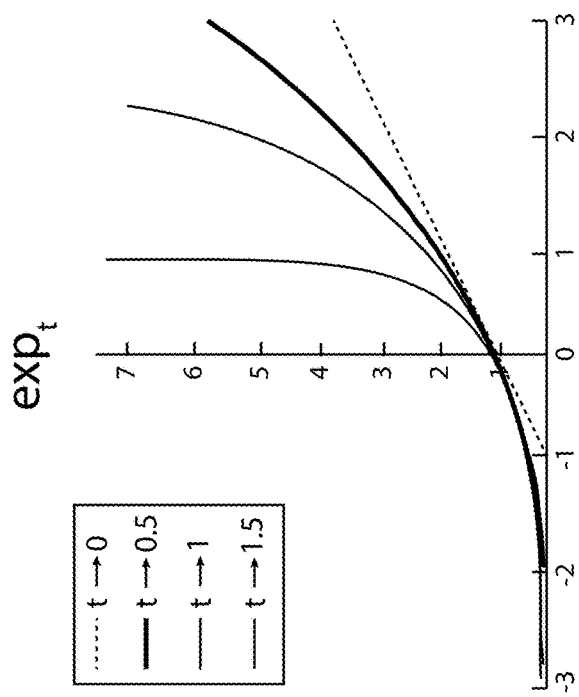

FIGS. 4A and 4B illustrate example results of exponential and logarithmic functions of the triplet embedding system in accordance with one or more embodiments. For example, FIG. 4A illustrates an example exponential function (i.e., $\exp_t$) for values $0 \le t < 2$. The $\exp_t$ function forms a basis for the t-exponential triplet embedding (t-ETE), which is both mentioned above and described in detail below. Note, that for t=1, the $\exp_t$ function reduces to a standard exponential function (i.e., exp).

With regard to FIG. 4A, the $\exp_t$ function, which is a convex, non-negative, non-decreasing function ($0 < t < 2$), is a generalization of the standard exponential function. In one or more embodiments, the $\exp_t$ function is defined as:

$$\exp_t(x) = \begin{cases} \exp(x) & \text{if } t = 1 \\ [1 + (1-t)x]_+^{1/(1-t)} & \text{otherwise} \end{cases} \quad (1)$$

where $[\cdot]_+ = \max(0, \cdot)$. The standard exponential function is recovered as the limit $t \to 1$.

FIG. 4B illustrates an example logarithmic function (i.e., $\log_t$) for values $0 \le t < 2$. In connection with FIG. 4B, the $\log_t$ function, in one or more embodiments, is defined as the inverse of $\exp_t$, as follows:

$$\log_t(x) = \begin{cases} \log(x) & \text{if } t = 1 \\ (x^{1-t} - 1)/(1-t) & \text{otherwise} \end{cases} \quad (2)$$

Note that the $\log_t$ function is concave, non-decreasing, and generalizes the standard logarithmic function (i.e., log), which is recovered as the limit $t \to 1$, as shown.

A major difference with the standard exponential and logarithmic functions is that the distributive properties of $\exp_t(ab) \ne \exp_t(a) \times \exp_t(b)$ and $\log_t(ab) \ne \log_t(a) + \log_t(b)$ generally do not hold true. Accordingly, for the values of x>1, the $\log_t$ function with t>1 grows slower than the standard logarithmic function. As such, employing $\log_t$ to define bending loss functions is a robust solution again noisy similarity constraints, as mention above.

An important property of $\exp_t$ is that $\exp_t$ decays to zero slower than the standard exponential function for values of 1<t<2. Accordingly, employing $\exp_t$ provides the triplet embedding system the benefit of heavy-tailed distributions under the $\exp_t$ function, similar to the standard exponential family of distributions. Specifically, the t-exponential family of distributions is defined as a generalization of the exponential family by adopting the $\exp_t$ function as follows:

$$P(x;\theta) = \exp_t(<x, \theta> - G_t(\theta)) \quad (3)$$

in which $(\cdot, \cdot)$ is the inner-product and $\theta$ denotes the canonical parameter of the distribution. Furthermore, $G_t(\theta)$ called the log-partition function, which ensures a normalized distribution.

In some embodiments, the t-exponential family includes Gaussian distribution as a special case when t=1. Additionally, Student's t-distribution can be written in the form of a t-exponential distribution as follows, where the density function of a zero-mean, unit-variance, one-dimensional Student's t-distribution with a degrees of freedom is defined as:

$$f_{St}(x; \alpha) = \frac{\Gamma((\alpha+1)/2)}{\sqrt{\pi\alpha}\,\Gamma(\alpha/2)} \left(1 + \frac{x^2}{\alpha}\right)^{-(\alpha+1)/2}. \quad (4)$$

By setting $-(\alpha+1)/2 = 1/(1\ t)$, Equation 4 can be written in the same form as Equation 3, shown above.

As mentioned above, the triplet embedding system uses a t-exponential triplet embedding (t-ETE) to generate a visualization. By way of background, in describing the triplet embedding problem, let I={1, 2, . . . , N} denote a set of items. Next, suppose that the triplet embedding (i.e., feature representation) of these items is unknown, but that triplets for the items are known. Therefore, let T={(i,j|k)} denote the set of triplets available for the set of items I.

Given the set of triplets T, the triplet embedding system identifies a triplet embedding X={$x_1, x_2, \ldots, x_N$} for the items such that the similarity constraints imposed by the triplets are satisfied as much as possible, using the Euclidean distance. As described above, the triplet embedding system may not require all the constraints to be satisfied in the embedding because noisy triplets (e.g., triplets with inconsistent and/or conflicting similarity constraints) often exist among the set of triplets.

As also mentioned above, noisy triplets are common when triples are collected through human evaluators via crowdsourcing. Further, conventional systems, such as t-distribution Stochastic Triplet Embedding (t-STE) drop significantly in performance when a small amount of noise is introduced to the triplets. For example, the noise could be from contradicting triplets in the same dataset, such as (i, j|k) and (i, k|j), which cannot be satisfied simultaneously in a single embedding. Thus, the triplet embedding system employs an improved triplet embedding method that is more robust to triplet noise.

Accordingly, the triplet embedding system employs t-ETE, which is a novel triplet embedding that does not suffer from the drawbacks of the t-STE function described above. In one or more embodiments, t-ETE benefits from the heavy-tailed properties of the t-exponential family and the robustness of non-convex bending loss functions. Thus, in contrast to the t-STE mentioned above, t-ETE is more robust to noise because it employs non-convex loss functions from t-logistic regressions, which, as described above, effectively handles triplet outlier noise.

As mentioned above, in some embodiments, the triplet embedding system uses the t-ETE function to determine a satisfaction probability. For example, when using t-ETE, the triplet embedding system defies the satisfaction probability of each triplet (i,j|k) as follows:

$$p_{ij|k}^{(t)} = \frac{\exp_t(-\|x_i - x_j\|^2)}{\exp_t(-\|x_i - x_j\|^2) + \exp_t(-\|x_i - x_k\|^2)} \quad (5)$$

In Equation 5, the numerator represents a t-Gaussian distribution, with a zero mean and unit variance. The numerator reduces to the standard Gaussian distribution for t=1. In addition, the triplet embedding system focuses on the heavy-tailed distributions, as described above, by setting the range of t as 1<t<2. Note, that for t=1 and t→2, Equation 5 reduces to the t-STE formulation (with $-(\alpha+1)/2=1/(1-t)^1$), respectively.

In addition to determining the satisfaction probability, as described above, the triplet embedding system minimizes the sum, over all the triplets, of the log of inverse properties. Stated differently, instead of maximizing the sum of logarithmic probabilities, the triplet embedding system considers the log of inverse probabilities and minimizes the sum over all triplets. The two objectives would be equal as long as the standard logarithmic function is applied. However, when defining the satisfaction probabilities using a t-Gaussian distribution, the triplet embedding system substitutes the standard logarithmic function with the $\log_t$ function to achieve better results. In particular, the triplet embedding system applies the $\log_t$ function as follows:

$$\min_x \sum_{(i,j|k) \in \mathcal{T}} \log_t(1/p_{ij|k}^{(t)}) = \min_x \sum_{(i,j|k) \in \mathcal{T}} \log_t\left(1 + \frac{\exp_t(-\|x_i - x_k\|^2)}{\exp_t(-\|x_i - x_j\|^2)}\right) \quad (6)$$

The resulting function is the t-ETE function. In t-ETE, the ratio of the two t-exponential distributions is non-negative. Further, as the triplet loss lowers, the triplet embedding system can better satisfy the triplet (i, j|k) using the distance ratio. Accordingly, through employing the t-ETE function, the triplet embedding system applies the transformation $\log_t(1+\bullet)$ on triplet loss, which results in a robust triplet loss function. In this manner, the triplet embedding system, through the new loss function, "gives up" similarity constraints that are highly unsatisfied and thus, handles noise more efficiently than conventional systems.

As also mentioned above, the triplet embedding system employs triplet similarity weights in one or more embodiments. In particular, the triplet embedding system employs a weighted version of t-ETE, which the triplet embedding system can apply when performing dimensionality reduction. For example, as part of creating triplet similarity weights for a dataset, the triplet embedding system obtains a triplet embedding (i.e., feature representation) for the dataset. Using the triplet embedding, the triplet embedding system creates data points for each item in the dataset. Alternatively, the triplet embedding system creates a limited set of triplets for the items in the dataset, as described above in connection with FIG. 3.

In one or more embodiments, the triplet embedding system forms triplets for each data point (i.e., item) by sampling two other data points in the dataset. The triplet embedding system then identifies the data point with the shorter distance as the more similar data point and the data point with the longer distance as the outlier data point. As mentioned above, as the distance ratio of a triplet decreases (and conversely the similarity ratio increases), the triplet becomes more distinct and definitive (e.g., sharper). Further, triplets that are originally sharper (e.g., are more distinct in the high-dimensional space) have a higher distance ratio and provide additional information. Thus, by giving more distinct triplets a higher importance than other triplets, the triplet embedding system can more accurately represent high-dimensional data in a lower-dimensional visualization.

Accordingly, the triplet embedding system gives higher weight to more distinct and definite triplets. In particular, given the pairwise distance dij between points i and j and the pairwise distance $d_{ik}$ between points i and k, the triplet embedding system assign the weight as:

$$\omega_{ijk} \propto \frac{\exp(-d_{ij}^2/\sigma_i^2)}{\exp(-d_{ik}^2/\sigma_i^2)} \quad (7)$$

where $\sigma_i$ serves as a smoothing factor. Additionally, as described above, the triplet embedding system normalizes the weights by dividing by the total sum and adding a constant value of γ>0 to obtain smoother weight distribution among the triplets. Accordingly, the objective function for the weighted t-ETE function becomes:

$$\min_x \sum_{(i,j|k) \in \mathcal{T}} \omega_{ijk} \log_t\left(1 + \frac{\exp_t(-\|x_i - x_k\|^2)}{\exp_t(-\|x_i - x_j\|^2)}\right) \quad (8)$$

Figure 5:
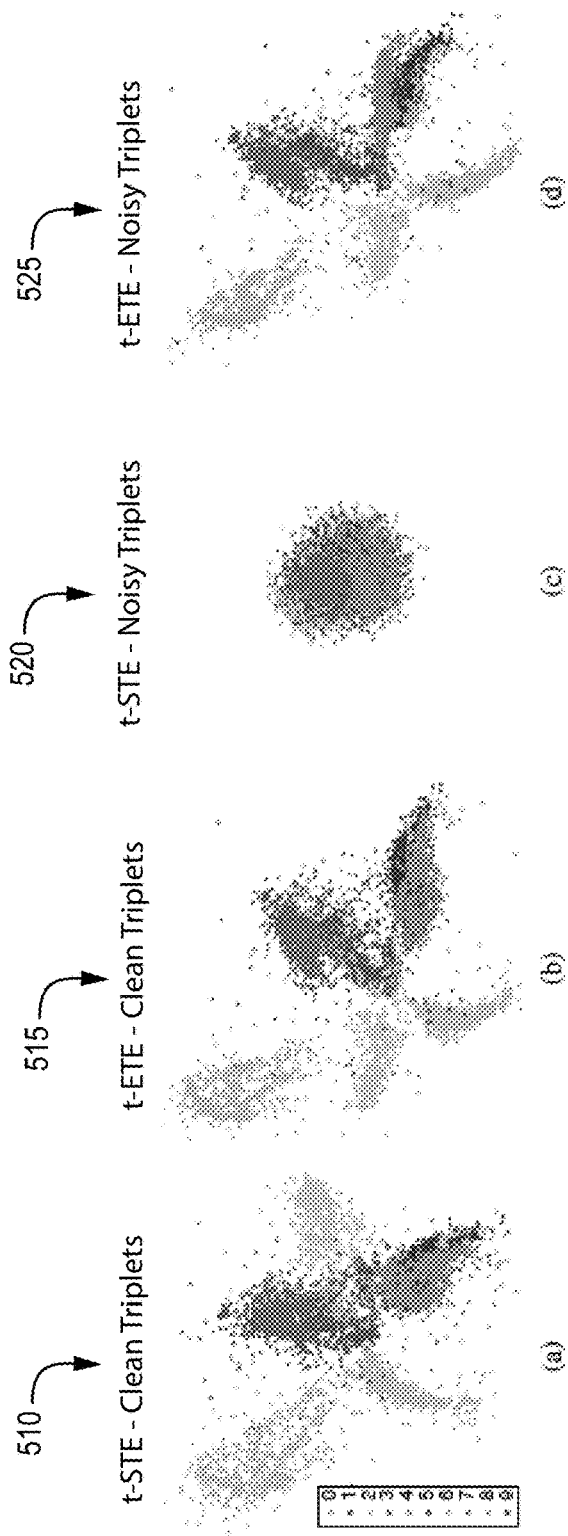
FIG. 5 illustrates examples of visualization results of the triplet embedding system in accordance with one or more embodiments compared to conventional systems.
Figure 6:
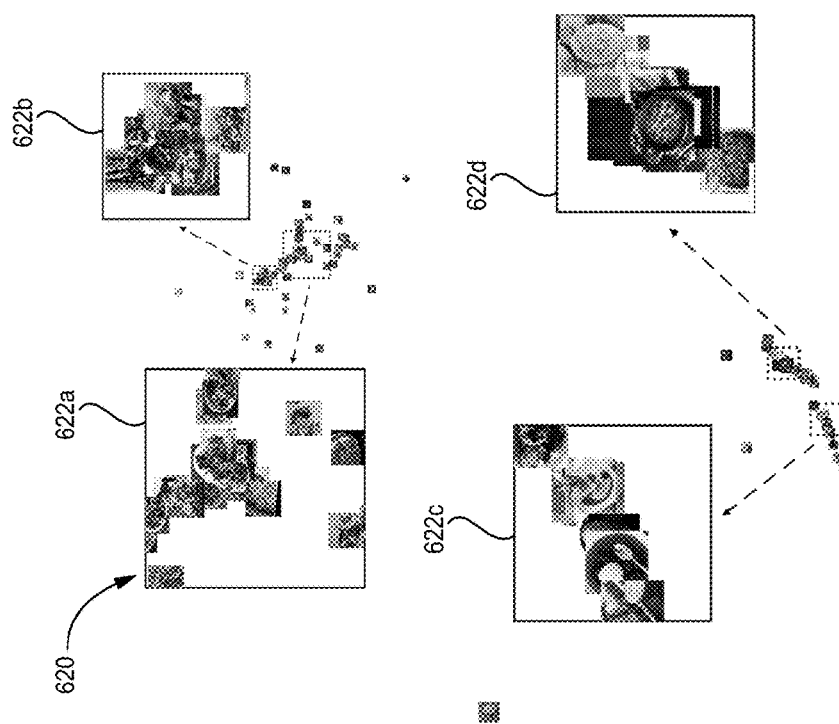
FIG. 6 illustrates additional examples of visualization results of the triplet embedding system in accordance with one or more embodiments compared to conventional systems.
Figure 6:
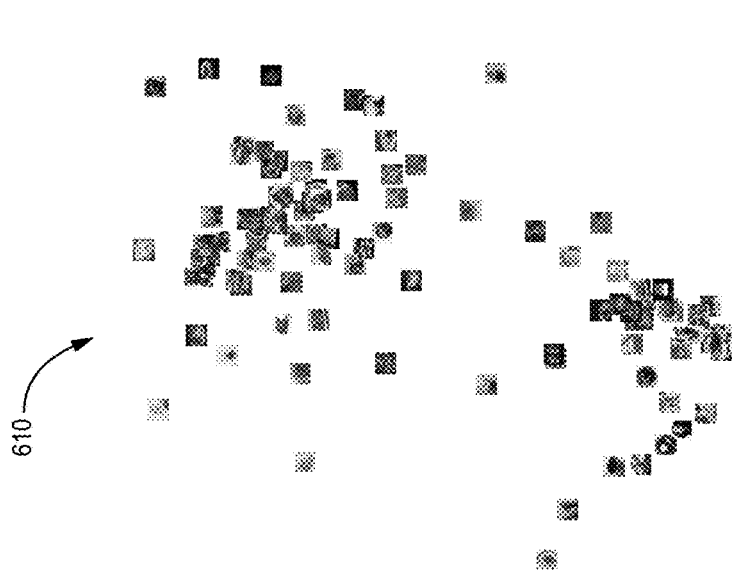
Figure 7:
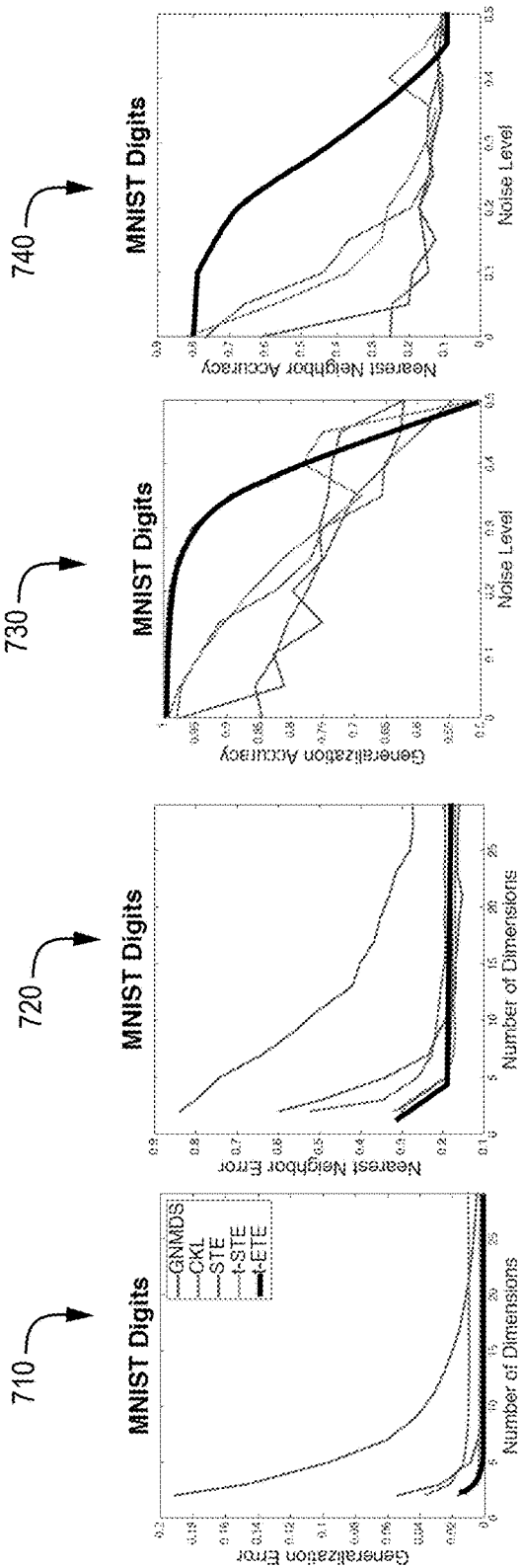
FIG. 7 illustrates example graphs results of the triplet embedding system in accordance with one or more embodiments compared to conventional systems.

As previously presented, the triplet embedding system performs a dimensionality reduction using the weighted t-ETE function to find a low-dimensional embedding for the data points in a dataset. Further, when the triplet embedding system also improves sampling in connection with generating the triplet sampling weights, the triplet embedding system can perform a dimensionality reduction with less computing resources than conventional systems. FIGS. 5-7 below, illustrate visualization results comparing the weighted t-ETE function employed by the triplet embedding system to the t-STE method used by conventional systems.

FIG. 5, as mentioned above, illustrates examples of visualization results from the triplet embedding system compared to conventional systems. In particular, FIG. 5 shows four example visualizations of triplet embeddings. Each example in FIG. 5 is based on a subset of 6,000 data points (i.e., items) from the MNIST (Mixed National Institute of Standards and Technology) dataset (from LeCun, Y. and Cortes, C., "The MNIST database of handwritten digits.," 1999). Triplets were synthetically generated for each point in the dataset by selecting a random data point from one of 50-nearest neighbors and another data point from data points located farther away, for a total of 100 triplets for each data point (600,000 triplets in total).

The first embedding 510 shows a visualization using t-STE and the second embedding 515 uses the weighted t-ETE method described above. In both the first and second embeddings, little or no noise was present in the dataset. As such, when noise is not present in the dataset, the two embeddings appear very similar. However, after adding 20% of noise, t-STE fails to produce a meaningful embedding (e.g., shown in the third embedding 520) while performance of weighted t-ETE is almost unaffected by the noise (e.g., shown as in the fourth embedding 525). Accordingly, as shown in FIG. 5, conventional systems degrade in the presence of noisy triplets, while the weighted t-ETE function employed by the triplet embedding system remains generally unaffected by noisy triplets.

FIG. 6 illustrates additional examples of visualization results from the triplet embedding system compared to conventional systems. The visualizations in FIG. 6 are based on a dataset containing 250, 320 crowd-sourced triplets queried on 100 different images of food (obtained from Wilber, Kwak, and Belongie, "Cost-effective hits for relative similarity comparisons," found in *Human Computation and Crowdsourcing (HCOMP)*, 2014). The dataset used in FIG. 6 represents real-world data without any pre-processing or pruning of the triplets.

As shown, the first visualization 610 employed t-STE while the second visualization 620 employed weighted t-ETE (t→2), which is described above. The same initialization for the data points was used for the both functions. As shown, the first visualization 610, which employed t-STE, has no clear clusters of food groups. In contrast, the second visualization 620 shows four distinct groupings. In particular, the second visualization 620 illustrates an "Entree" group 622a, a "Vegetables" group 622b, an "Ice Cream Desserts" group 622c, and a "Breads and Cookies" group 622d.

FIG. 7 illustrates example graphs results of the triplet embedding system compared to conventional systems. In general, FIG. 7 shows generalization and nearest-neighbor performance between the weighted t-ETE described herein and various conventional systems (Generalized Non-Metric Multidimensional Scaling ("GNMDS"), Crowd Kernel Learning ("CKL"), STE, and t-STE) using the MNIST dataset shown in FIG. 5 above. As shown, the first graph 710 displays a generalization error, the second graph 720 displays a nearest-neighbor error, the third graph 730 displays the generalization accuracy in the presence of noise, and the fourth graph 740 displays the nearest-neighbor accuracy in the presence of noise.

The graphs in FIG. 7 are the results of an experiment that evaluated the performance of different triplet embedding functions using generalization to unseen triplets as well as preserving the nearest-neighbor similarity. To evaluate the generalization performance, a 10-fold cross validation was performed, with results reporting the fraction of held-out triplets that were unsatisfied as a function of the number of dimensions. The results provide a quantitative indication of how well the each triplet embedding function learned the underlying structure of the data. Additionally, the nearest-neighbor error was calculated as a function of the number of dimensions, which measures how well each triplet embedding function captures the pairwise similarity of the objects based on relative comparisons.

As shown in the first graph 710 and the second graph 720, t-ETE performs as good or better than any conventional triplet embedding function on both generalization error and nearest-neighbor error, particularly in the presence of noise. As such, the results in FIG. 7 indicate that weighted t-ETE successfully captures the underlying structure of the high-dimensional data and properly scales with the number of dimensions.

The experiment also evaluated the robustness of the different triplet embedding functions with respect to triplet noise. To evaluate performance robustness, a different test set of triplets was generated from the MNIST dataset. The test set includes the same number of triplets as the original dataset (e.g., 600,000 triplets). For various levels of noise level (e.g., 0-50%), a subset of triplets was randomly sampled within the test set, and the order of items within the triplet was reversed (e.g., (i, j|k) became (i, k|j)). After generating the embedding, the performance of each triplet embedding function was evaluated, with the results indicating the percentage (e.g., fraction) of satisfied triplets. As shown in the third graph 730 and the fourth graph 740, the performance of each conventional system starts to drop immediately when only a small amount of noise was added to the data. Conversely, the weighted t-ETE remains robust to triplet noise such that the performance was almost unaffected, up to 20% of noise as shown.

FIGS. 1-7, the corresponding text, and the examples provide a number of different systems and devices for triplet embedding in accordance with one or more embodiments. In addition to the foregoing, one or more embodiments can also be described in terms of flowcharts comprising acts in a method for accomplishing a particular result. For example, FIGS. 8-9 illustrate flowcharts of exemplary methods in accordance with one or more embodiments.

Figure 8:
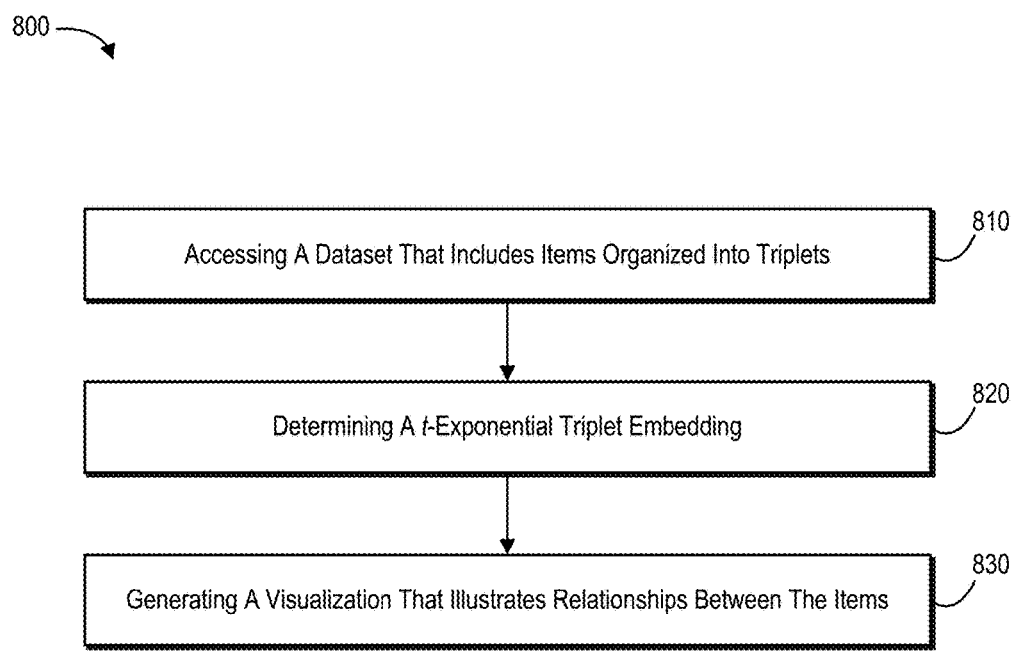
FIG. 8 illustrates an example flow diagram of a method for triplet embedding by ignoring one or more unsatisfied similarity constraints in accordance with one or more embodiments.
Figure 9:
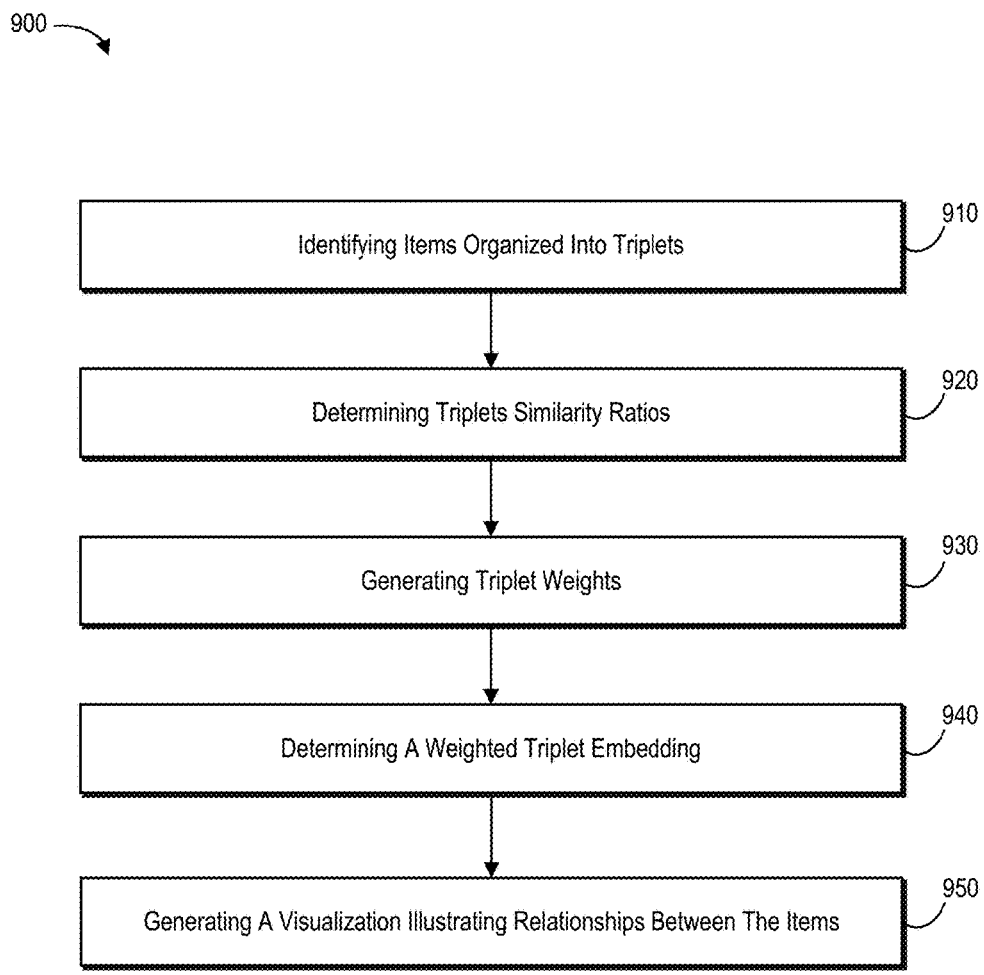
FIG. 9 illustrates an example flow diagram of a method for embedding triplets using weighted triplets in accordance with one or more embodiments.

FIG. 8 illustrates an example flow diagram of a method 800 for triplet embedding by ignoring one or more unsatisfied similarity constraints. In one or more embodiments, the method 800 is implemented on a computing device, such as a client device or a service device. Further, in some embodiments, the method 800 is implemented in a digital environment for dimensionality reduction in high-dimensional space, as described above.

The method 800 includes an act 810 of accessing a dataset that includes items organized into triplets. In particular, act 810 can involve accessing a dataset that includes items organized into triplets, each triplet based on similarity constraints between the items in the triplet. In some embodiments, a triplet includes a first item, a second item, and a third item. Further, the similarity constraints between the items in the triplet include an indication that the first item is more similar to the second item than the first item is to the third item.

As shown in FIG. 8, the method 800 further includes an act 820 of determining a t-exponential triplet embedding. In particular, the act 820 can involve determining a triplet embedding by minimizing an inverse probability that the triplets are satisfied while ignoring one or more similarity constraints that cause noise. In one or more embodiments, the act 820 includes determining triplet embedding that uses a heavy-tailed t-exponential distribution. In some embodiments, the act 820 includes minimizing a non-convex bending loss function. In additional embodiments, the act 820 involves employing a log function of inverse probabilities that minimizes a sum over the triplets. In one or more embodiments, the act 820 includes sampling a subset of the triplets and determining a triplet embedding includes minimizing an inverse probability that the subset of triplets are satisfied.

Additionally, the method 800 includes an act 830 of generating a visualization that illustrates relationships between the items. In particular, the act 830 can involve generating a visualization that illustrates relationships between the items of the dataset based on the generated triplet embedding (e.g., feature representation). In some embodiments, the items are located in high-dimensional space, and the act 840 involves generating a visualization that illustrates relationships between the items of the dataset by generating a lower-dimensional map such that the lower-dimensional map preserves the structure of the items as found in the high-dimensional space.

FIG. 9 illustrates an example flow diagram of a method for embedding triplets using weighted triplets. In one or more embodiments, the method 900 is implemented on a computing device, such as a client device or a service device. Further, in some embodiments, the method 900 is implemented in a digital environment for dimensionality reduction in high-dimensional space, as described above.

The method 900 includes an act 910 of identifying items organized into triplets. In particular, act 910 can involve identifying a plurality of items organized into a plurality of triplets. In one or more embodiments, the act 910 involves generating triplets based on identifying a set of nearest-neighbor items for a first item in a triplet, identifying a set of non-nearest-neighbor items for the first item, and generating a triplet that comprises the first item, a nearest-neighbor item from the set of nearest-neighbor items, and a non-nearest-neighbor item from the set of non-nearest-neighbor items. In some embodiments, each non-nearest-neighbor item is randomly selected from a subset of items within the set of items that excludes the set of nearest-neighbor items for the item.

As shown in FIG. 9, the method 900 further includes an act 920 of determining triplet similarity ratios. In particular, the act 920 involves determining a similarity ratio between items in triplets of the plurality of triplets. In one or more embodiments, the act 920 can include determining the similarity ratios between items in triplets by comparing a similarity between a first item and a second item in a given triplet to a similarity between the first item and a third item in the given triplet. In further embodiments, the act 920 can include determining a distance ratio comparing a first pairwise distance between the first item and the second item over a second pairwise distance between the first item and the third item, where the similarity ratio is inversely proportional to the distance ratio for the given triplet. In some embodiments, determining the similarity ratios for each triplet is also based on applying a smoothing factor.

The method 900 also includes an act 930 of generating triplet weights. In particular, the act 930 can involve generating a weight for triplets of the plurality of triplets based on the determined similarity ratios. In one or more embodiments, the act 930 includes increasing the weight of each triplet as the similarity ratio corresponding to the triplet increases. Further, in some embodiments, the weight for a given triplet is inversely proportional to the similarity ratio of the triplet.

As shown in FIG. 9, the method 900 further includes an act 940 of determining a weighted triplet embedding. In particular, the act 940 involves determining a weighted triplet embedding using the generated weights for the triplets. In one or more embodiments, the act 940 includes determining a weighted triplet embedding using the generated weights for the triplets by minimizing an inverse probability that the triplets are satisfied while ignoring one or more similarity constraints that cause noise.

Additionally, the method 900 includes an act 950 of generating a visualization illustrating relationships between the set of items. In particular, the act 950 can involve generating a visualization illustrating relationships between the items based on the generated triplet embedding. In some instances, the visualization is a scatter-plot mapping. Further, in some embodiments, the method 900 also includes an act of enabling selection of one or more item within the generated visualization.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, as a server device, and/or as a cloud-computing system. A digital medium environment allows users to identify and apply a triplet embedding (e.g., feature vector) to high-dimensional data to achieve dimensionality reduction.

Embodiments of the present disclosure may comprise or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium that is used to store desired program code means in the form of computer-executable instructions or data structures, and that is accessible by a general-purpose or special-purpose computer.

Computer-executable instructions comprise, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 10:
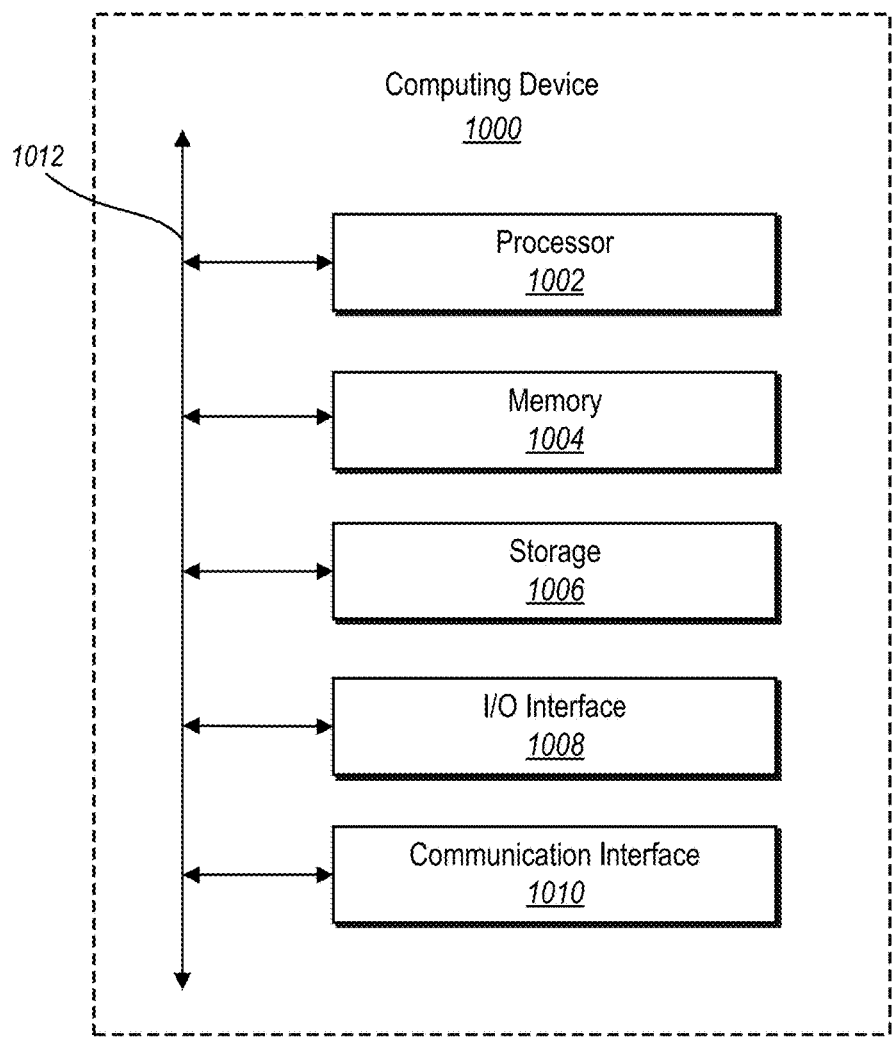
FIG. 10 illustrates a block diagram of an exemplary computing device in accordance with one or more embodiments.

FIG. 10 illustrates a block diagram of an exemplary computing device 1000 that may be configured to perform one or more of the processes described above. One will appreciate that one or more computing devices, such as the computing device 1000 may represent the client device 102 or server device(s) 106, which are described above. In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device).

As shown in FIG. 10, the computing device 1000 can comprise one or more processor(s) 1002, memory 1004, a storage device 1006, input/output ("I/O") interfaces 1008, and a communication interface 1010, which may be communicatively coupled by way of a communication infrastructure (e.g., bus 1012). While an exemplary computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read-Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital environment for dimensionality reduction in high-dimensional spaces, a computer-implemented method for triplet embedding, the method comprising:
   accessing, by a computing device, a dataset that comprises items organized into triplets, each triplet based on similarity constraints between the items in the triplet;
   performing a step for generating a feature representation for the triplets that minimizes an inverse probability that the similarity constraints for the triplets are satisfied and ignores one or more similarity constraints that cause noise;
   generating, by the computing device, a visualization that illustrates relationships between the items of the dataset based on the generated feature representation; and
   displaying, on the computing device, the visualization within a graphical user interface.

2. The method of claim 1, wherein performing the step for generating the feature representation for the triplets comprises using heavy-tailed t-exponential distributions.

3. The method of claim 2, wherein performing the step for generating the feature representation for the triplets comprises minimizing a non-convex bending loss function.

4. The method of claim 1, wherein a triplet comprises a first item, a second item, and a third item, and wherein the similarity constraints between the items in the triplet comprise an indication that the first item is more similar to the second item than the first item is to the third item.

5. The method of claim 1, wherein the items are located in high-dimensional space, and wherein generating the visualization that illustrates relationships between the items of the dataset comprises generating a lower-dimensional map such that the lower-dimensional map preserves the structure of the items as found in the high-dimensional space.

6. The method of claim 1, wherein generating the visualization comprises generating a scatter-plot.

7. The method of claim 1, further comprising enabling selection of one or more item within the generated visualization.

8. The method of claim 1, wherein the step for generating the feature representation for the triplets comprises weighting the triplet based on a similarity ratio between items in a given triplet.

9. The method of claim 8, further comprising sampling a subset of the triplets, wherein the feature representation for the triplets minimizes an inverse probability that the subset of triplets is satisfied.

10. A non-transitory computer readable storage medium comprising instructions that, when executed by at least one processor, cause a computer system to:
    identify a plurality of items organized into a plurality of triplets based on similarity constraints between items in the triplets;
    determine a similarity ratio between the items of the plurality of triplets;
    generate a weight for triplets of the plurality of triplets based on the determined similarity ratios;
    determine a weighted triplet embedding using the generated weights for the triplets by minimizing an inverse probability that the similarity constraints for the triplets are satisfied while ignoring one or more similarity constraints that cause noise; and
    generate and display a visualization illustrating relationships between the items based on the generated triplet embedding.

11. The non-transitory computer readable storage medium of claim 10, wherein the instructions, when executed by the at least one processor cause the computer system to determine the similarity ratio for a given triplet by comparing a similarity between a first item and a second item in the given triplet to a similarity between the first item and a third item in the given triplet.

12. The non-transitory computer readable storage medium of claim 11, wherein the instructions, when executed by the at least one processor cause the computer system to determine the similarity ratio for the given triplet comprises determining a distance ratio comparing a first pairwise distance between the first item and the second item over a second pairwise distance between the first item and the third item, wherein the similarity ratio is inversely proportional to the distance ratio for the given triplet, and wherein the weight for the given triplet is proportional to the similarity ratio of the given triplet.

13. The non-transitory computer readable storage medium of claim 10, further comprising instructions, that when executed by the at least one processor cause the computer system to apply a smoothing factor to the generated weights for the triplets.

14. The non-transitory computer readable storage medium of claim 10, further comprising instructions, that when executed by the at least one processor cause the computer system to generate the plurality of triplets by performing steps comprising:
    identifying a set of nearest-neighbor items for a first item;
    identifying a set of non-nearest-neighbor items for the first item; and
    generating a triplet that comprises the first item, a nearest-neighbor item from the set of nearest-neighbor items, and a non-nearest-neighbor item from the set of non-nearest-neighbor items.

15. The non-transitory computer readable storage medium of claim 14, wherein each non-nearest-neighbor item is randomly selected from a subset of items of the plurality of items that excludes the set of nearest-neighbor items for the first item.

16. The non-transitory computer readable storage medium of claim 10, wherein ignoring the one or more similarity constraints that cause noise reduces conflicting triplets similarity constraints.

17. A system for performing dimensionality reduction in high-dimensional space using triplet embedding, the system comprising:
    a memory comprising a plurality of items organized into a plurality of triplets, each triplet based on similarity constraints between the items in the triplet;
    at least one computing device communicatively coupled with the memory and storing instructions thereon, that, when executed by the at least one computing device, cause the system to:
       determine similarity ratios between items in triplets of the plurality of triplets by comparing, for a given triplet, a similarity between a first item and a second item in the given triplet to a similarity between the first item and a third item in the given triplet;
       generate weights for triplets of the plurality of triplets that are inversely proportional to the determined similarity ratios;
       determine a triplet embedding using the generated weights for the triplets by minimizing an inverse probability that the similarity constraints for the triplets are satisfied while ignoring one or more similarity constraints that cause noise; and generate a visualization that illustrates relationships between the items in the plurality of items based on the determined triplet embedding.

18. The system as recited in claim 17, wherein the instructions, when executed by the at least one computing device, cause the system to determine the triplet embedding using the generated weights for the triplets by performing steps comprising:

applying a t-exponential logarithmic transformation function to the triplets;

inverting probabilities within the logarithmic transformation function; and minimizing a sum over the triplets.

19. The system as recited in claim 17, wherein the instructions, when executed by the at least one computing device, cause the system to determine the triplet embedding using the generated weights for the triplets by excluding the similarity constraints from outlier triplets that are unsatisfied by the determined triplet embedding.

20. The system as recited in claim 17, further comprising instructions, that when executed by the at least one computing device, cause the system to generate the plurality of triplets by performing steps comprising:

identifying a set of nearest-neighbor items for a first item;

identifying a set of non-nearest-neighbor items for the first item; and generating a triplet that comprises the first item, a nearest-neighbor item from the set of nearest-neighbor items, and a non-nearest-neighbor item from the set of non-nearest-neighbor items.

* * * * *